(12) United States Patent
Agombar et al.

(10) Patent No.: US 8,285,679 B2
(45) Date of Patent: Oct. 9, 2012

(54) CREATING A BUFFER POINT-IN-TIME COPY RELATIONSHIP FOR A POINT-IN-TIME COPY FUNCTION EXECUTED TO CREATE A POINT-IN-TIME COPY RELATIONSHIP

(75) Inventors: John P. Agombar, Hampshire (GB); Christopher B. Beeken, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 13/039,245

(22) Filed: Mar. 2, 2011

(65) Prior Publication Data
US 2011/0225124 A1 Sep. 15, 2011

(30) Foreign Application Priority Data
Mar. 11, 2010 (EP) ..................................... 10156177

(51) Int. Cl.
*G06F 17/00* (2006.01)
(52) U.S. Cl. .......................... 707/639; 707/704; 707/685
(58) Field of Classification Search .................. 707/639, 707/704, 685
See application file for complete search history.

(56) References Cited

U.S. PATENT DOCUMENTS
| 7,188,272 B2 | 3/2007 | Bartfai et al. |
| 2006/0112244 A1 | 5/2006 | Buah et al. |
| 2006/0139697 A1 | 6/2006 | Fuente |
| 2006/0200640 A1 | 9/2006 | Agombar et al. |

(Continued)

FOREIGN PATENT DOCUMENTS
WO 2010049314 5/2010

OTHER PUBLICATIONS
PCT International Search Report & Written Opinion dated Aug. 25, 2011 for Application No. PCT/EP2011/053440, filed Mar. 8, 2011.

(Continued)

*Primary Examiner* — Belix M Ortiz Ditren
(74) *Attorney, Agent, or Firm* — David W. Victor; Konrad Raynes & Victor LLP

(57) ABSTRACT

Provided are a method, system, and computer program product for creating a buffer point-in-time copy relationship for a point-in-time copy function executed to create a point-in-time copy relationship. A point-in-time copy function is initiated to create a new point-in-time copy relationship from a source volume comprising a first volume to a target volume comprising a second volume. Detection is made that the target volume of the new point-in-time copy relationship is a source volume of a first pre-existing point-in-time copy relationship having as a target volume a third volume. Detection is also made that the target volume of the first pre-existing point-in-time copy relationship is a source volume of a second pre-existing point-in-time copy relationship having as a target volume a fourth volume. A buffer point-in-time copy relationship having a source volume comprising the target volume of the first pre-existing relationship and a target volume comprising a fifth volume is created in response to detecting that the target volume of the new point-in-time copy relationship is the source volume of the first pre-existing point-in-time copy relationship and the detected that the target volume of the first pre-existing point-in-time copy relationship is the source volume of the second pre-existing point-in-time copy relationship.

24 Claims, 5 Drawing Sheets

U.S. PATENT DOCUMENTS

2007/0061531 A1     3/2007    Bartfai et al.
2007/0294493 A1    12/2007    Buah et al.
2010/0088468 A1*    4/2010    Agombar et al. ............. 711/112

OTHER PUBLICATIONS

U.S. Appl. No. 13/039,108, filed Mar. 2, 2011 by inventors J.P. Agombar, et al.

U.S. Appl. No. 13/069,293, filed Mar. 22, 2011 by inventors J.P. Agombar, et al.

U.S. Appl. No. 13/244,094, filed Sep. 23, 2011 by inventors C.B. Beeken, et al.

U.S. Appl. No. 13/251,867, filed Oct. 3, 2011 by inventors C.B. Beeken, et al.

* cited by examiner

CREATING A BUFFER POINT-IN-TIME COPY RELATIONSHIP FOR A POINT-IN-TIME COPY FUNCTION EXECUTED TO CREATE A POINT-IN-TIME COPY RELATIONSHIP

CROSS-REFERENCE TO RELATED FOREIGN APPLICATION

This application is a non-provisional application that claims priority benefits under Title 35, Unites States Code, Section 119(a)-(d) from European Patent Application entitled "BUFFER DISK IN FLASHCOPY CASCADE" by John P. AGOMBAR and Christopher B. BEEKEN, having European Patent Application No. EP10156177, filed on Mar. 11, 2010, which application is incorporated herein by reference in its entirety.

BACKGROUND

1. Technical Field

This invention relates to a method, system, and computer program product for creating a buffer point-in-time copy relationship for a point-in-time copy function executed to create a point-in-time copy relationship.

2. Related Art

The storage of data in large organisations is of fundamental importance, both for reliability of the data and for the ability to recover data in the event of any hardware failure. Storage Area Network (SAN) is an architecture that is used when very large amounts of data are needed to be stored in a reliable and secure manner. This technology allows networks to be created that support the attachment of remote computer storage devices such as disk arrays to servers in such a way that, to the operating system, the devices appear as locally attached. It is common in these networks to include a large amount of redundancy, both in the data storage and in the hardware connections between the individual components.

Various methods exist for creating data redundancy. For example, a function such as a FlashCopy® function enables an administrator to make point-in-time, full volume copies of data, with the copies immediately available for read or write access. (FlashCopy is a registered trademark of International Business Machines Corporation in the United States and other countries) The FlashCopy function can be used with standard backup tools that are available in the environment to create backup copies on tape. The FlashCopy function creates a copy of a source volume on a target volume. This copy, as mentioned above, is called a point-in-time copy. When a FlashCopy operation is initiated, a relationship is created between a source volume and target volume. This relationship is a "mapping" of the source volume and the target volume. This mapping allows a point-in-time copy of that source volume to be copied to the associated target volume. The relationship exists between this volume pair from the time that the FlashCopy operation is initiated until the storage unit copies all data from the source volume to the target volume, or the relationship is deleted.

When the data is physically copied, a background process copies tracks from the source volume to the target volume. The amount of time that it takes to complete the background copy depends on various criteria, such as the amount of data being copied, the number of background copy processes that are running and any other activities that are presently occurring. The FlashCopy function works in that the data which is being copied does not actually need to be copied instantaneously, it only needs to be copied just prior to an update causing on overwrite of any old data on the source volume. So, as data changes on the source volume, the original data is copied to the target volume before being overwritten on the source volume.

Therefore, a FlashCopy is a feature supported on various storage devices that allows a user or an automated process to make nearly instantaneous copies of entire logical volumes of data. A copy of a source disk is made on a target disk. The copies are immediately available for both read and write access. A common feature of FlashCopy like implementations is the ability to reverse the copy. That is, to populate the source disk of a FlashCopy map with the contents of the target disk. It is also possible to use FlashCopy in cascaded implementations, in which a target disk later becomes the source disk for a further FlashCopy or vice versa.

In order to keep track of such cascaded storage volumes and FlashCopy functions, it is preferable to provide a data structure that defines primary and secondary "fdisks". An fdisk is a logical component that includes an index defining the storage volume to which the fdisk relates and providing links to the relevant maps that define the up and down directions of the FlashCopy functions in a cascade. When a FlashCopy function is created between a source volume and a target volume, then primary fdisks are created for each storage volume, unless a primary fdisk already exists for the target disk, in which case that existing fdisk for the target volume is converted to a secondary fdisk and a new primary fdisk is created. The advantage of using a data structure as defined by the fdisks is that the fdisks can be used to keep track of the IO read and write accesses to different storage volumes within existing multiple cascades and direct data reads to the correct location within the cascade.

SUMMARY

Provided are a method, system, and computer program product for creating a buffer point-in-time copy relationship for a point-in-time copy function executed to create a point-in-time copy relationship. A point-in-time copy function is initiated to create a new point-in-time copy relationship from a source volume comprising a first volume to a target volume comprising a second volume. Detection is made that the target volume of the new point-in-time copy relationship is a source volume of a first pre-existing point-in-time copy relationship having as a target volume a third volume. Detection is also made that the target volume of the first pre-existing point-in-time copy relationship is a source volume of a second pre-existing point-in-time copy relationship having as a target volume a fourth volume. A buffer point-in-time copy relationship having a source volume comprising the target volume of the first pre-existing relationship and a target volume comprising a fifth volume is created in response to detecting that the target volume of the new point-in-time copy relationship is the source volume of the first pre-existing point-in-time copy relationship and the detected that the target volume of the first pre-existing point-in-time copy relationship is the source volume of the second pre-existing point-in-time copy relationship.

According to an aspect of the described embodiments, there is provided a method of operating a copy function comprising initiating a new FlashCopy function from a source volume to a target volume, detecting that the target volume of the new FlashCopy function is the source volume for an existing FlashCopy function, detecting that the target volume of the existing FlashCopy function has a secondary volume, and creating a buffer FlashCopy function from the target volume of the new FlashCopy function to a new target volume.

According to a further aspect of the described embodiments, there is provided a system for operating a copy function comprising a plurality of storage volumes and a storage volume controller connected to the storage volumes, the storage controller arranged to initiate a new FlashCopy function from a source volume to a target volume, detect that the target volume of the new FlashCopy function is the source volume for an existing FlashCopy function, detect that the target volume of the existing FlashCopy function has a secondary volume, and create a buffer FlashCopy function from the target volume of the new FlashCopy function to a new target volume.

According to a yet further aspect of the described embodiments, there is provided a computer program product on a computer readable medium for operating a copy function, the product comprising instructions for initiating a new FlashCopy function from a source volume to a target volume, detecting that the target volume of the new FlashCopy function is the source volume for an existing FlashCopy function, detecting that the target volume of the existing FlashCopy function has a secondary volume, and creating a buffer FlashCopy function from the target volume of the new FlashCopy function to a new target volume.

DETAILED DESCRIPTION

Figure 1:
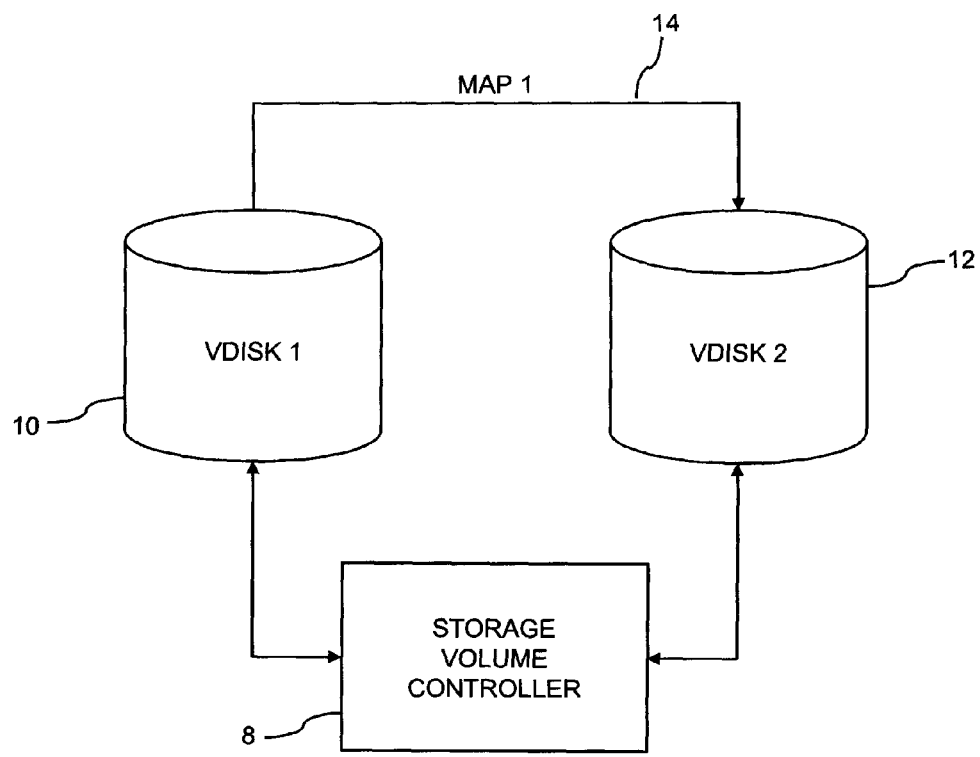
FIG. 1 is a schematic diagram of a pair of storage disks.

In a FlashCopy cascade, in order to bind the number of clean operations required for a given write operation there requires the limiting of the number of concurrent restore operations. For instance, in a FlashCopy cascade of $A \leftrightarrows B \leftrightarrows C \leftrightarrows D$, where A, B, C and D are disks in the graph and the arrows are the FlashCopy maps, then denoting (A, B) to be a FlashCopy mapping from disk A to disk B, the cascade has maps (A, B), (B, C) and (C, D). In this cascade of disks and FlashCopy functions, a write to disk A can cause a split write to disk B, which is required to maintain the image on disk B and this will cause clean reads of disks B and C and clean writes to disk D followed by disk C. In this way a single write to the top disk in the cascade can result in a large number of clean operations on storage volumes further down the cascade.

With described embodiments, it is possible to provide buffered FlashCopy maps, which enable unbounded FlashCopy restore operations. The system and method embodiment describes a procedure to remove the restriction in the prior art implementations of FlashCopy cascades in which a single write can result in a large number of clean operations occurring down the cascade, which will slow down the completion of the original write action at the top of the cascade. The embodiments introduce the concept of a buffered FlashCopy. That is, when a FlashCopy is started onto the source of another active map whose target has a secondary volume, a new space efficient FlashCopy is created and started, which will prevent the clean operations from spreading throughout the cascade.

This method adds an extra step to the starting of a FlashCopy map, whose target volume is already the source volume of an already existing active FlashCopy map. This step is to ask if the target, X, of the FlashCopy map being started is the source of an active FlashCopy map, 1, whether the target, Y, of the map 1 has a secondary fdisk, and if so, then create a buffer FlashCopy from X to a new space efficient vdisk X'.

In considering the example given above in the prior art discussion, in the new scheme, according to an example of the invention, when (B, C) is started, resulting in cascades $B \leftrightarrows C$ and $C \leftrightarrows D$, because the target of the map being started, C is part of map $C \leftrightarrows D$ but D does not have a secondary. Now, when (A, B) is started there is created a buffer FlashCopy function (B, B'), and started, because the target B is part of $B \rightarrow C$ and C has a secondary. This new buffer FlashCopy function results in the creation of a cascade $A \leftrightarrows B$, $B \leftrightarrows B' \leftrightarrows C$ and $C \leftrightarrows D$. Once this has been created, a new write to disk A will result in a clean read of disk B and a clean write to disk B'. No matter how large the FlashCopy graph becomes, a single write will only result in a single clean operation. The map (B, B') will be in a permanent cleaning mode. This means that any data on disks B' or C will be cleaned in the background.

The buffer FlashCopy map will exist for at least the lifetime of the map $A \rightarrow B$ and $B \leftrightarrows C$ and $C \leftrightarrows D$. If $A \rightarrow B$ or $C \leftrightarrows D$ are stopped or complete the map $B \leftrightarrows B'$ cleans and removes itself from the cascade. If $B \leftrightarrows C$ is stopped or completes the map $B \leftrightarrows B'$ can be stopped immediately. This means that the cleaning required to maintain the cascades is independent of the number of interlocked cascades. In a further embodiment, it is possible to extend the idea and perform additional clean writes (more than the one described in the example above) to reduce the number of buffer FlashCopy maps per interlocked cascades.

FIG. 1 illustrates the concept of a FlashCopy using a storage controller 8 and two storage disks 10 and 12. The disks 10 and 12 could form part of a larger array of disks, and would typically form part of an enterprise storage solution. The disks 10 and 12 could be part of a storage solution relating to a commercial website, for example. If at any time a backup needs to be made of the content of vdisk1, then a FlashCopy instruction can be sent from the storage volume controller 8 to that disk 10, which defines a source disk 10 (vdisk1) and also a target disk 12 (vdisk2), which is the target of the FlashCopy. The FlashCopy instruction creates a point-in-time copy of the image of the specific vdisk which is the source disk 10.

In the example of FIG. 1, the source disk 10 of a first FlashCopy instruction is vdisk1, and the target disk 12 is vdisk2. The FlashCopy instruction starts the FlashCopy process, which creates a map 14 from the source disk 10 to the target disk 12. This map is labelled map 1 in the Figure. The image of vdisk1 at this specific point in time is now available on vdisk2. This creates a backup of the data on vdisk1, and also allows tests and other administration tasks to be run on the data of vdisk1, without the attendant danger of losing any of the original data, as it is preserved on the original source disk.

When a FlashCopy is made, it creates a link between the two disks 10 and 12, as defined by the map 14. Data may now be copied across in the background, with the additional requirement that any access to vdisk2 (as the target disk 12) will immediately cause the relevant parts of the image of vdisk1 to be copied across, and also any access to vdisk1 which would result in a change to the image stored by that disk 10 will also cause the unaltered data to be immediately copied across to the target disk 12, prior to the change being made. In this way, the vdisk2, to an outside user, stores the point in time copy of vdisk1, although data will only be physically copied across under the circumstances described above.

Figure 2:
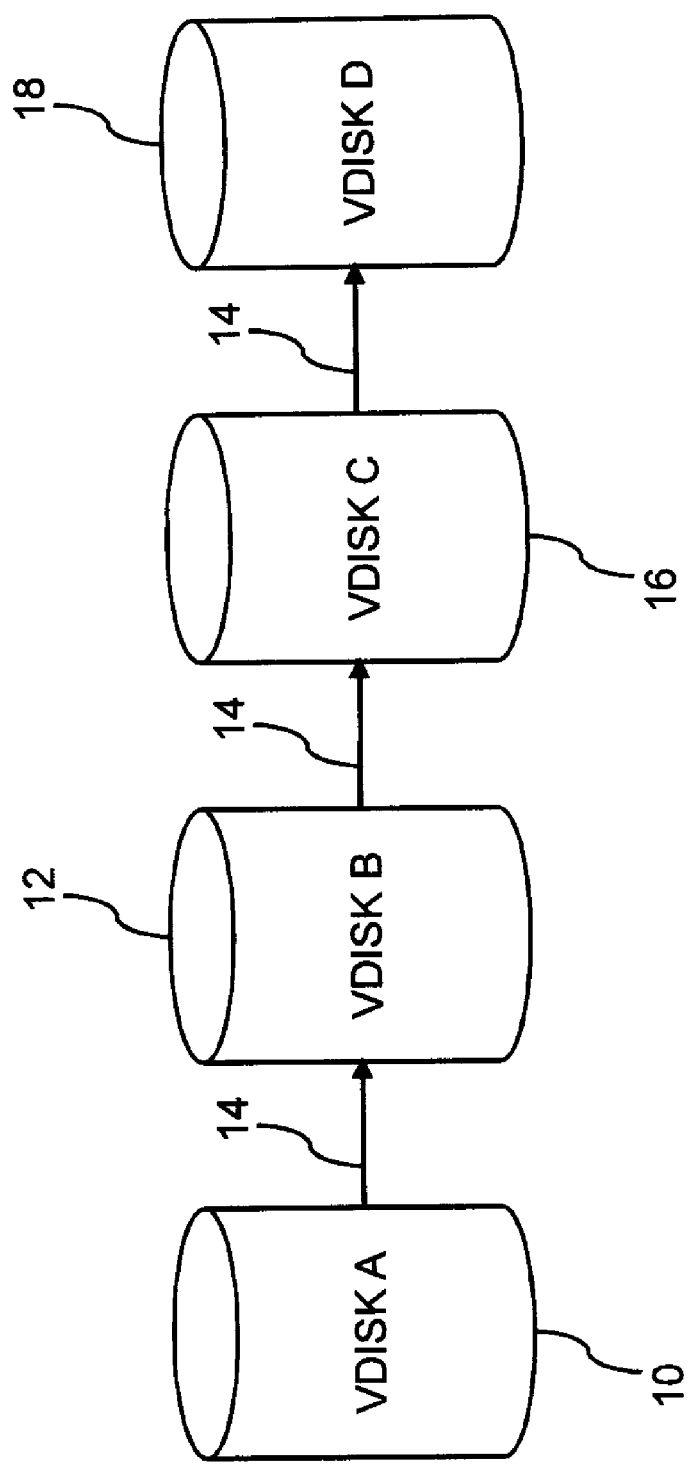
FIG. 2 is a schematic diagram of a FlashCopy cascade.

A storage volume that is the target volume of a FlashCopy function can also be the source volume of a further FlashCopy function, thus creating a cascade of storage volumes. FIG. 2 shows an example of a cascade of four storage volumes 10, 12, 16 and 18, which are linked by respective FlashCopy maps 14. Each map 14 defines a FlashCopy function from a source volume to a target volume. Disk B is providing a backup of disk A, disk C is providing a backup of disk B and disk D is providing a backup of disk C. The FlashCopy functions 14 linking the different storage volumes would have been started at different times, which create different point-in-time copies of the images stored by the respective storage volumes.

In the FlashCopy cascade of A⇆B⇆C⇆D, where A, B, C and D are the disks in the cascade, shown in FIG. 2, and the arrows are the FlashCopy maps, then denoting (A, B) to be a FlashCopy mapping from disk A to disk B, the cascade has maps (A, B), (B, C) and (C, D). In a prior art implementation of such a cascade, any new data write to disk A can cause a split write to disk B, as per the respective FlashCopy function, which is required to maintain the image on disk B. This writing to disk B will cause further clean reads of disks B and C and clean writes to disk D followed by a write to disk C. In this way a single write to the first storage volume 10 in the cascade can result in a large number of clean operations throughout the cascade.

Therefore, a limitation of such a prior art FlashCopy cascade is that in order to bound the number of clean operations required for a given write operation there requires the limiting of the number of concurrent restore operations. Since the writes to disk A will be the normal running of the service supported by the storage volume A, then it is important from a business point of view that these writes are completed as quickly as possible. In the cascade of FIG. 2, a write to disk A cannot be completed until all of the dependent read and writes, described above, have taken place, because if anything fails during this process, the whole transaction will need to be backed up.

Figure 3:
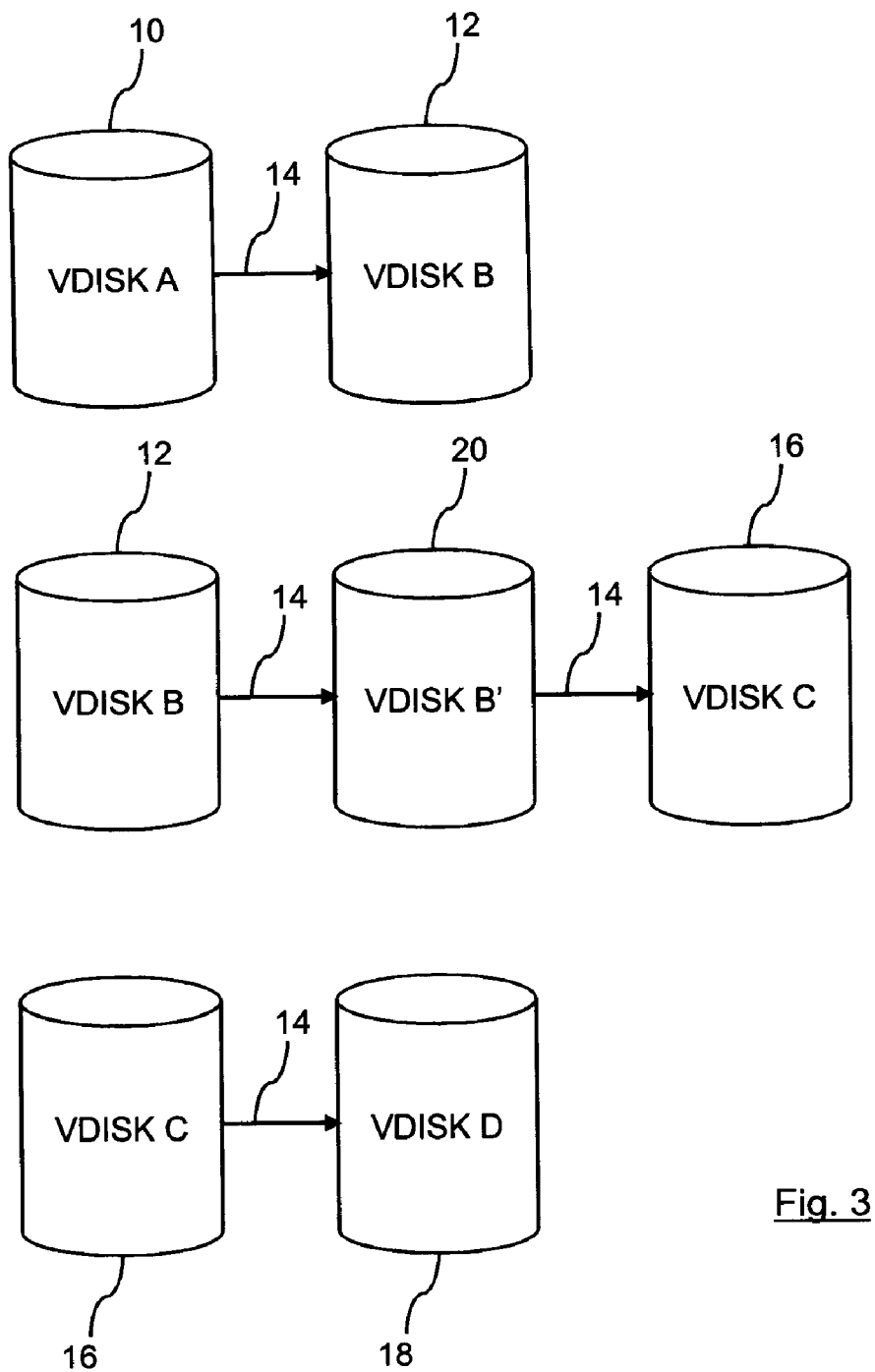
FIG. 3 is a schematic diagram of an extended FlashCopy cascade.

FIG. 3 shows how the configuration of FIG. 2 is extended to ameliorate the problem of the delay in completing the initial write to vdisk A. The storage volume controller 8 adds an extra step to the start of a FlashCopy map whose target volume is already the source volume of an active FlashCopy map. This step is effectively to query the target volume of the new map being started to see if the target volume is the source volume of an active FlashCopy map, and whether the target volume of that active map has a secondary fdisk, and if so, then the storage volume controller will create a buffer Flash-Copy from the target volume of the original FlashCopy to a new space efficient vdisk. A secondary is as defined above. A vdisk has two images that it can present. These are referred to a fdisks. The primary fdisk is the image presented to any host system. That is the data returned for read operations. The secondary fdisk is the image used by other FlashCopy maps that require data held on other vdisks to present its images.

In considering the example of FIG. 2 given above, in the new scheme when (B, C) is started, resulting in cascades B⇆C and C⇆D, because the target of the map being started, C is part of map C⇆D but D does not have a secondary at this point there is no problem. However, when (A, B) is started there is created a buffer FlashCopy function (B, B'), because the target B is part of B→C and C has a secondary. This new buffer FlashCopy function results in the creation of a cascade comprising A⇆B, B⇆B'⇆C and C⇆D, using a new storage volume 20. Once this has been created, a write to disk A will result in a clean read of disk B and a clean write to disk B'. No matter how large the FlashCopy graph becomes, a single write will only result in a single clean operation. The map (B, B') will be in a permanent cleaning mode. This means that any data on disk B' or disk C will be cleaned in the background.

The buffer FlashCopy map (B, B') will exist for at least the lifetime of the map A→B and B⇆C and C⇆D. If A→B or C⇆D are stopped or complete the map B⇆B' cleans and removes itself from the cascade. If B⇆C is stopped or completes the map B⇆B' can be stopped immediately. This means that the cleaning required in order to maintain the cascade is independent of the number of interlocked cascades. The new target disk 20 which is the target of the buffer FlashCopy function effectively creates a break in the original cascade, and will absorb the changes needed from disk B that resulted from the original write to disk A. This write can then be completed and the cleaning of B' onto C and down the cascade can be carried out.

Figure 4:
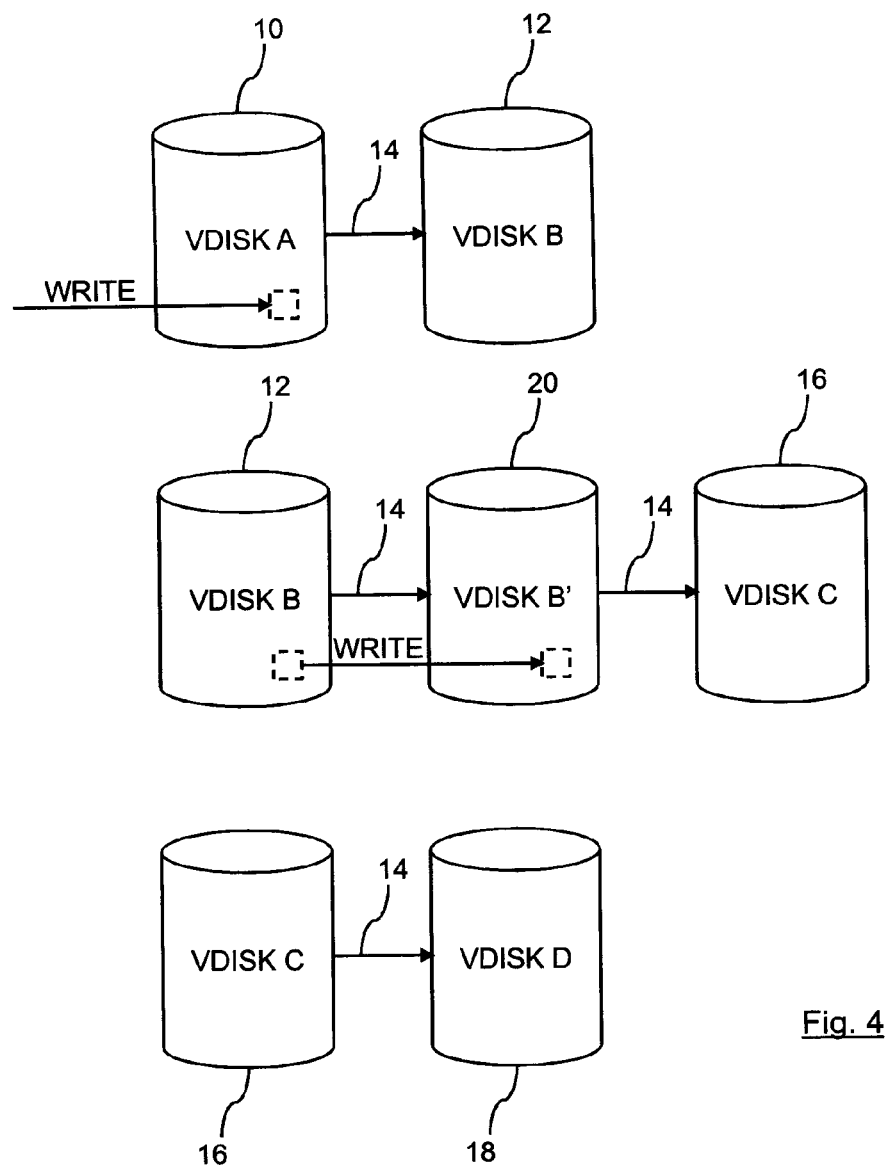
FIG. 4 is a schematic diagram of the extended FlashCopy cascade with a data write.

FIG. 4 shows how a write to disk A is handled, once the buffer FlashCopy function is set up. The existence of the new target disk 20, the vdisk B', results in a boundary for the IO to the disk A. A new write to disk A will result in a clean read of disk B and a clean write to disk B'. No further actions down the cascade to disks C or D are required at this point. The original IO to disk A can be completed, and this results in an improvement in the length of time required to complete the original IO to disk A, when compared to the prior art cascades of multiple disks in series.

The existence of the buffer FlashCopy function and the new target storage volume 20 mean that there is removed any restriction on the order of starting FlashCopy maps. The storage volume B' acts as a break in the cascade, and once original IO has been completed, the data on the volume B' can be cleaned onto disk C as a normal background process. Storage volume B' is a temporary store for the data written from disk B, and the data that is present on the storage volume B' does not persist after it has been cleaned onto disk C.

The volumes that are lower down in the cascade function in their normal manner, as do the maps 14 between these storage volumes. In the example of FIGS. 3 and 4, the disks C and D, which are lower down in the cascade, are unaware of the existence of the new target disk B' that has been inserted into the cascade, and are also unaware of the presence of the buffer FlashCopy function. These disks C and D continue as normal and the cleaning of the data from the new target disk B' to the disk C is handled as a normal write of data to that disk C, which will trigger the FlashCopy function to perform a write onto disk D, if the specific data on C has not yet been copied across.

Figure 5:
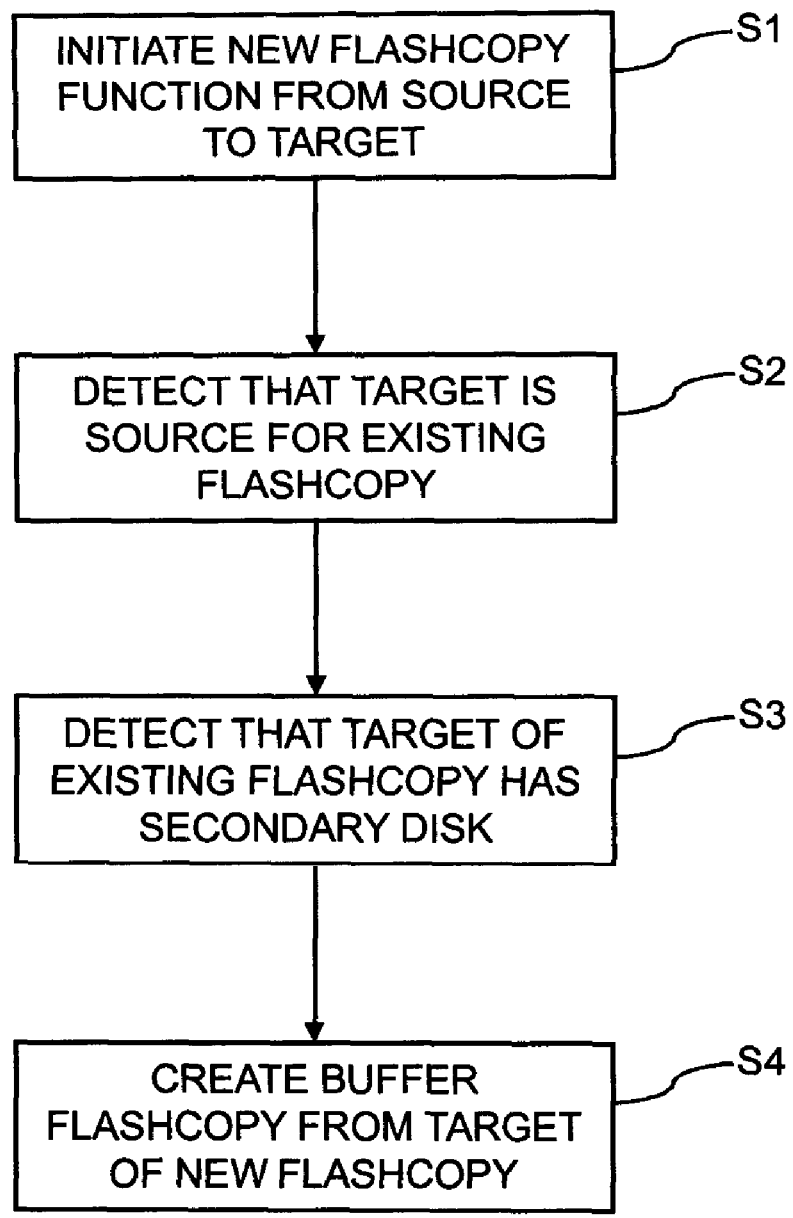
FIG. 5 is a flowchart of a method of operating a copy function.

A flowchart summarising the process of operating the copy function, in the set-up stage, is shown in FIG. 5. The method of operating the copy function, which is carried out by the storage volume controller 8, comprises as a first step S1, which comprises the step of initiating a new FlashCopy function from a source volume to a target volume. In the example of FIG. 4, the source volume is the vdisk A and the target volume is the vdisk B, with the new FlashCopy function that is to be created being the FlashCopy function 14 from the vdisk A to the vdisk B. This new FlashCopy function could have been created by an administrator or could have been created automatically by software.

The second step S2 in the method is the step of detecting that the target volume (vdisk B) of the new FlashCopy function is also the source volume for an existing FlashCopy function. In the context of the example of FIG. 4, the existing FlashCopy function is the mapping function from vdisk B to vdiskC. Therefore, in this example, the vdisk B, which is the target of the new FlashCopy function is also the source of an existing FlashCopy function. The storage volume controller 8 can perform this detection step based upon the details that the controller 8 maintains in relation to existing mappings of FlashCopy functions from source volumes to target volumes.

The next step in the process is the step S3 of detecting that the target volume (vdisk C) of the existing FlashCopy function (B⇆C) has a secondary volume (in this case vdisk D). This again can be performed by the storage volume controller 8 using the existing data on FlashCopy functions and their sources and targets. Finally, at step S4 there is the concluding step of creating the buffer FlashCopy function (B→B') from the target volume (vdisk B) of the new FlashCopy function to the new target volume (vdisk B'). In this way, a break is introduced into the cascade at the vdisk B', and the IO to the original disk A is now bounded.

What is claimed is:

1. A method of operating a copy function to create a point-in-time copy relationship, comprising:
   initiating a point-in-time copy function to create a new point-in-time copy relationship from a source volume comprising a first volume to a target volume comprising a second volume;
   detecting that the target volume of the new point-in-time copy relationship is a source volume of a first pre-existing point-in-time copy relationship having as a target volume a third volume;
   detecting that the target volume of the first pre-existing point-in-time copy relationship is a source volume of a second pre-existing point-in-time copy relationship having as a target volume a fourth volume; and
   creating a buffer point-in-time copy relationship having a source volume comprising the target volume of the first pre-existing relationship and a target volume comprising a fifth volume in response to detecting that the target volume of the new point-in-time copy relationship is the source volume of the first pre-existing point-in-time copy relationship and detecting that the target volume of the first pre-existing point-in-time copy relationship is the source volume of the second pre-existing point-in-time copy relationship, wherein the creating the buffer point-in-time copy results in a cascade of the first volume to the second volume, the second volume to the fifth volume, the fifth volume to the third volume, and the third volume to the fourth volume.

2. The method of claim 1, wherein data in the source volumes in the point-in-time copy relationships are copied to the corresponding target volumes in the point-in-time copy relationships in response to an update to the source volumes while the source volumes and the target volumes are in the point-in-time copy relationship.

3. The method of claim 2, wherein the point-in-time copy function comprises a FlashCopy function and wherein the point-in-time copy relationships comprise FlashCopy relationships.

4. The method of claim 1, further comprising:
   receiving a data write to the first volume;
   performing a corresponding data read of the second volume; and
   performing a data write to the fifth volume of the data read from the second volume.

5. The method of claim 4, further comprising:
   completing the data write to the first volume in response to performing a corresponding data read of the first volume and performing a data write to the second volume.

6. The method of claim 4, further comprising:
   performing a data write on the third volume comprising the target volume of the first pre-existing point-in-time copy relationship of the data written to the fifth volume.

7. The method of claim 1, further comprising:
   performing as a background copy operation after data written to the first volume is written to the fifth volume, writing data written to the fifth volume to the third volume in the first pre-existing point-in-time copy relationship and writing data written to the third volume to the fourth volume in the second pre-existing point-in-time copy relationship.

8. The method of claim 1, further comprising:
   removing the buffer point-in-time copy relationship in response to detecting that the first or second point-in-time copy relationship has stopped or completed the copy function.

9. A system, comprising:
   a plurality of storage volumes including a first, second, third, fourth and fifth volumes; and
   a storage volume controller connected to the volumes, the storage controller operated to perform:
   initiating a point-in-time copy function to create a new point-in-time copy relationship from a source volume comprising a first volume to a target volume comprising a second volume;
   detecting that the target volume of the new point-in-time copy relationship is a source volume of a first pre-existing point-in-time copy relationship having as a target volume the third volume;
   detecting that the target volume of the first pre-existing point-in-time copy relationship is a source volume of a second pre-existing point-in-time copy relationship having as a target volume the fourth volume; and
   creating a buffer point-in-time copy relationship having a source volume comprising the target volume of the first pre-existing relationship and a target volume comprising the fifth volume in response to detecting that the target volume of the new point-in-time copy relationship is the source volume of the first pre-existing point-in-time copy relationship and detecting that the target volume of the first pre-existing point-in-time copy relationship is the source volume of the second pre-existing point-in-time copy relationship, wherein the creating the buffer point-in-time copy results in a cascade of the first volume to the second volume, the second volume to the fifth volume, the fifth volume to the third volume, and the third volume to the fourth volume.

10. The system of claim 9, wherein data in the source volumes in the point-in-time copy relationships are copied to the corresponding target volumes in the point-in-time copy relationships in response to an update to the source volumes while the source volumes and the target volumes are in the point-in-time copy relationship.

11. The system of claim 10, wherein the point-in-time copy function comprises a FlashCopy function and wherein the point-in-time copy relationships comprise FlashCopy relationships.

12. The system of claim 9, wherein the operations further comprise:
   receiving a data write to the first volume;
   performing a corresponding data read of the second volume; and
   performing a data write to the fifth volume of the data read from the second volume.

13. The system of claim 12, wherein the operations further comprise:
completing the data write to the first volume in response to performing a corresponding data read of the first volume and performing a data write to the second volume.

14. The system of claim 12, wherein the operations further comprise:
performing a data write on the third volume comprising the target volume of the first pre-existing point-in-time copy relationship of the data written to the fifth volume.

15. The system of claim 9, wherein the operations further comprise:
performing as a background copy operation after data written to the first volume is written to the fifth volume, writing data written to the fifth volume to the third volume in the first pre-existing point-in-time copy relationship and writing data written to the third volume to the fourth volume in the second pre-existing point-in-time copy relationship.

16. The system of claim 9, wherein the operations further comprise:
removing the buffer point-in-time copy relationship in response to detecting that the first or second point-in-time copy relationship has stopped or completed the copy function.

17. A computer program product on a computer readable storage medium for operating a point-in-time copy function with respect to a first volume, second volume, third volume, fourth volume, and fifth volume, the product comprising instructions executed to cause operations, the operations comprising:
initiating a point-in-time copy function to create a new point-in-time copy relationship from a source volume comprising a first volume to a target volume comprising a second volume;
detecting that the target volume of the new point-in-time copy relationship is a source volume of a first pre-existing point-in-time copy relationship having as a target volume the third volume;
detecting that the target volume of the first pre-existing point-in-time copy relationship is a source volume of a second pre-existing point-in-time copy relationship having as a target volume the fourth volume; and
creating a buffer point-in-time copy relationship having a source volume comprising the target volume of the first pre-existing relationship and a target volume comprising the fifth volume in response to detecting that the target volume of the new point-in-time copy relationship is the source volume of the first pre-existing point-in-time copy relationship and detecting that the target volume of the first pre-existing point-in-time copy relationship is the source volume of the second pre-existing point-in-time copy relationship, wherein the creating the buffer point-in-time copy results in a cascade of the first volume to the second volume, the second volume to the fifth volume, the fifth volume to the third volume, and the third volume to the fourth volume.

18. The computer program product of claim 17, wherein data in the source volumes in the point-in-time copy relationships are copied to the corresponding target volumes in the point-in-time copy relationships in response to an update to the source volumes while the source volumes and the target volumes are in the point-in-time copy relationship.

19. The computer program product of claim 18, wherein the point-in-time copy function comprises a FlashCopy function and wherein the point-in-time copy relationships comprise FlashCopy relationships.

20. The computer program product of claim 17, wherein the operations further comprise:
receiving a data write to the first volume;
performing a corresponding data read of the second volume; and
performing a data write to the fifth volume of the data read from the second volume.

21. The computer program product of claim 20, wherein the operations further comprise:
completing the data write to the first volume in response to performing a corresponding data read of the first volume and performing a data write to the second volume.

22. The computer program product of claim 20, wherein the operations further comprise:
performing a data write on the third volume comprising the target volume of the first pre-existing point-in-time copy relationship of the data written to the fifth volume.

23. The computer program product of claim 17, wherein the operations further comprise:
performing as a background copy operation after data written to the first volume is written to the fifth volume, writing data written to the fifth volume to the third volume in the first pre-existing point-in-time copy relationship and writing data written to the third volume to the fourth volume in the second pre-existing point-in-time copy relationship.

24. The computer program product of claim 17, wherein the operations further comprise:
removing the buffer point-in-time copy relationship in response to detecting that the first or second point-in-time copy relationship has stopped or completed the copy function.

* * * * *